3,419,409
PROCESS FOR COATING
Conrad J. Dettling, York, Pa., assignor, by mesne assignments, to The Polymer Corporation, a corporation of Pennsylvania
No Drawing. Continuation of application Ser. No. 331,982, Nov. 14, 1963. This application Apr. 3, 1967, Ser. No. 628,160
9 Claims. (Cl. 117—18)

ABSTRACT OF THE DISCLOSURE

The invention disclosed herein is an improved process for forming a uniform coating of an organic polymeric resin which comprises immersing an article to be coated in a fluidized bed and rotating the article in order to coat all surfaces of the article with the coating material.

---

This invention relates to coatings on the surfaces of articles and to a method of producing such coatings.

Articles to be coated may be made of various materials such as metals, including steel, iron, aluminum, copper, zinc, as well as alloys thereof. Coatings have been proposed which are particularly suitable for protecting the surfaces of such articles which are exposed to normally destructive chemicals, or corrosive agents, or which must be electrically insulated, or which must resist mechanical abrasive or frictional wear. However, materials which meet the criteria for the field of use frequently, because of the fact that they are refractory to solvents and other chemicals for which these materials may be valued, are difficult to use in the production of coatings by common presently known methods, such as by painting or spraying in a liquid solvent or liquid dispersion form.

Accordingly, it is an object of the invention to provide a new and improved process for the production of uniform coatings without the necessity for the use of liquid solvents or dispersing agents for the coating materials.

In carrying out the coating process of this invention the coating material, preferably in the form of pulverulent granules, is transformed into a continuously fluidized bed, by introducing a gas under pressure therein; the bed being maintained in the fluidized state by controlling the flow of gas. The article to be coated is heated and immersed into the fluidided bed of the coating material. Individual particles of the coating material adhere and melt and fuse together with other particles on the hot surface of the immersed portion of the article to form a continuous coating thereon, as described more fully below.

A fluidized bed is, by definition, a mass of solid particles which exhibits the liquid-like characteristics of mobility, hydrostatic pressure, and an observable upper free surface or boundary zone across which a marked change in concentration of particles occurs. The fluidized bed is thus alternatively defined as a "dense phase." These definitions are to be found in the article entitled, "Fluidization Nomenclature and Symbols," appearing at pp. 1249 and 1250 in "Industrial and Engineering Chemistry," vol. 41, No. 6, June 1949.

The heating of the article should be to a temperature above the sintering or melting point of the coating material. By "melting point" is here meant that stage wherein the coating material is sufficiently coalesced to provide a continuous coating of the article. By "sintering point" is here meant that stage wherein the coating material is sufficiently "tacky" or "sticky" to adhere to the surface of the article.

In practicing a process of coating heated articles by immersion in fluidized beds of dry and pulverent solid coating materials, as disclosed in the patent of Gemmer No. 2,844,489, dated July 22, 1958, it has become apparent that simple immersion in the fluidized bed often is not sufficient to cause the formation of a complete and uniform and smooth coating on the article which is immersed. This observation is particularly true with respect to downwardly facing surfaces of articles.

Therefore, another important object of the present invention is to provide an improved process which is particularly suited for uniformly coating articles which, during the period of immersion in the fluidized bed, have a portion of the immersed surface in a downwardly facing position. Articles which have a relatively plain shape as well as articles with irregular or complex shapes may be advantageously coated by the process of this invention. Such articles may include, for instance, ventilators, gears, pump and blower housings, switches, electrical fittings, tanks and vessels, protective caps, bushings, bellows, and innumerable other articles of greater or less complexity of shape.

Another object of the invention is to coat objects which have essentially surfaces of revolution, such as wire and tubes.

Other objects and advantages of the invention will be apparent from the following description.

According to the invention the article having a surface to be coated is immersed in a dense phase of the fluidized bed of coating material, while the surface is heated to a temperature below the deterioration temperature of the article, but at least as high as the sintering temperature of the particles. The article is then rotated either partially along a horizontal axis or fully along a horizontal or vertical axis, to obtain a substantially uniform coating over the entire surface of the article. For example, articles of less intricate shape, generally speaking, can be uniformly coated by partial rotation of at least 30° about a horizontal axis to a second position or attitude; and preferably the angle of rotation is at least about 90°. Stated otherwise, in at least one of the positions the article has a substantially downward facing surface portion which is rotated at least 30°, and preferably 90°, about a horizontal axis or about an axis having a horizontal component from said one position. In essence then, there is no continuously downward facing surface of an article coated by means of partial rotation whether the article is rotated while immersed in the fluidized bed (without to-and-fro movement), or withdrawn from the fluidized bed rotated, and then, reimmersed therein.

On the other hand, articles of more complex shape are preferably fully or continuously rotated in the fluidized bed along either a horizontal or vertical axis thereof for uniformly coating the surface of the article. In this regard, it will be understood that advantageous coatings are obtainable during full rotation when the axis of rotation has a substantial horizontal or vertical component, or both components. Therefore, the terms horizontal and vertical axis are used hereinafter in their broadest sense and include rotation along an axis oblique to the horizontal and vertical axis. Moreover, some articles are uniformly coated by full rotation first in one direction, and then in another direction during the immersion period in the fluidized bed, and preferably fully rotated articles are rotated up until the time they are removed from the fluidized bed.

In the Gemmer patent referred to above, it is disclosed that improved coatings may be obtained by maintaining the immersed article in to-and-fro motion. In the present invention it is not necessary to impart any translational motion to the article while it is immersed (except that incident to moving the article into and out of the bed), the advantages being obtained by changing the attitude of the article during the period of immersion.

The exact reasons for the quality and uniformity of the coatings obtained by rotating the article in the fluidized bed are not known. However, as opposed to the inferior coating obtained in the downward facing surface when an article is merely immersed in the bed, articles coated by means of the present invention are uniformly coated over the entire surface including the downward facing surface. Additionally, while the quality of coating on the downward facing surface can be improved by imparting to-and-fro motion to the article in the bed, other surfaces of the article, particularly horizontal surfaces became more thickly coated than other surfaces, which creates non-uniformity of the coating and adds to the overall expense of the method. On the other hand, by rotating the article during the coating process the entire surface of the article is more uniformly coated. One explanation of this advantageous phenomenon is that when the article is rotated, no surface thereof is continually downward facing during the coating process. Thus, the problem of coating the downward facing surface is eliminated. Also, heavier coatings do not occur on the upward horizontal surfaces as readily, if at all, because the attitude of the article is changed and these surfaces are not exposed to less active fluidizing areas near the top of the coating container. An additional explanation for the uniformity of the coating is that during or because of rotation excess granules that accumulate on horizontal surfaces and in nooks and crevices and which do not coalesce tend to fall off the surface of the article so that these surfaces do not become more thickly coated than other surfaces. Thus, rotational motion is advantageous for uniformly coating objects with large horizontal surface areas and with convoluted surfaces. Additionally, depending on the shape of the article, the article can be coated by full rotation in the bed and removed therefrom without adhering granules, which eliminates the need for additional post-heating treatments, described more fully subsequently. Thus, the method of the invention is more economical to perform and there is less waste of the coating material.

This invention is particularly valuable for, and applicable to, the production of coatings from high melting, high molecular weight organic polymeric thermoplastic resins, such as polyethylene and the linear polyamides generally referred to as nylons. Nylons which are particularly useful are polyhexamethylene adipamide, polyhexamethylene sebacamide, and the polycaprolactams, such as the polymer of epsilon-caprolactam. However, the protective coatings of this invention may consist of practically any material which (1) will not seriously decompose when temporarily heated above its melting point, and (2) has a melting point lower than the deterioration temperature of the material from which the particular articles to be coated are made.

Among other coating materials which are suitable for the present purposes are thermosetting resins, which are cured by incorporating a suitable curing agent in the coating. Various filling materials, including abrasives, may also be added to the coating material.

The coating material, as has been stated above, is preferably used in pulverulent form and preferably has a granular size of between about 0.001 and about 0.024 inch. Best results have been obtained with a granular size of between 0.002 and about 0.012 inch.

Any gas such as nitrogen which is reasonably inert at the temperatures and with the materials employed may be used as the gaseous medium for fluidizing the coating material. Air is usually satisfactory and is preferred for reasons of economy. The operating details disclosed in the Gemmer patent referred to above may be followed.

While the article is immersed in the fluidized bed, it is heated to a temperature above the melting point of the fluidized material. When the heated article is immersed in the fluidized bed, the fluidized powder flows evenly over all portions of the immersed surface of the article so that every part of the article comes into contact therewith. The important feature of the present invention is that by changing the attitude of the article as described above, all surfaces of the article exposed to the fluidized bed are uniformly coated. Alternatively, the article can be heated to a temperature above the sintering point of the fluidized material, but below the melting point, to coat the article, and then the article can be post-heated to fuse the coating into a smooth continuous layer.

The thickness of the coating can be largely regulated by regulation of the preheating temperature of the article as well as regulation of the time of immersion.

The best heating temperature for coating in accordance with the process of this invention is very largely dependent upon the size, shape, thickness and heat-storage capacity of the article to be coated. A satisfactory temperature may be found within the confines of the range bounded by the sintering or melting point of the coating material as a lower limit and the melting or softening point of the article to be coated as an upper limit.

The period of immersion in the fluidized bed may vary within relatively wide limits depending upon the thickness of the coating desired. Depending upon the size and heat capacity of the article to be coated, the thickness of the coating desired, the powdered coating material used, and the temperature to which the article is heated, the best immersion time may vary from a fraction of a second upward. Generally, the time of immersion is kept below about 50 seconds, and preferably below about 30 seconds. However, usually an immersion time in the order of 5 to 8 seconds is quite adequate for the production of a coating which completely cover the surfaces on which a coating is desired. When longer immersion times are desired in order to produce an unusually thick coating, it is sometimes preferable to repeat the process of immersion for shorter periods in order to obtain the longer total period of immersion.

Partial or full rotation of the article in the fluidized bed is believed to be advantageous for uniformly coating the article for the reasons that during rotation accumulation of the powder on the surface of the article (which does not melt or sinter upon contact with the heated article) are removed efficiently due to the effects of gravity, centrifugal forces, and/or the turbulence in the fluidized bed. Removal of the powder decreases or eliminates entirely the tendency of the excess powder to fuse incompletely, which is commonly referred to as "sugar coating."

In other coating procedures wherein accumulations of powder do not coalesce into the coating, either the powder must be removed from the article with a high-velocity stream of gas immediately after the article is removed from the fluidized bed (which is wasteful of coating material) or the article has to be post-heated to perfect the smoothness and texture of the coating (which involves an extra operating step and may produce a heavier coating in localized areas). Post-heating may be employed, however, in connection with articles coated in the present invention, but this is merely an optional step.

Other advantages attach more particularly to full rotation of the article in the dense phase. For example, by way of contrast to the to-and-fro method, when large articles are to be coated, it is not expedient to impart to-and-fro movement manually, and thus, resort must be had to vibratory devices. Vibration has often proved unsuccessful as it is difficult to vibrate large articles with sufficient amplitude to amount to a suitable to-and-fro movement. One of the reasons for this difficulty is that often the article to be coated is substantially large, and also oddly shaped, so that it is difficult to clamp the vibratory device to the article in a manner to obtain suitable efficiency from the vibratory device for to-and-fro movement. It has been found that these articles, and even those of lesser complexity, are expeditiously handled by suspending them from a slowly moving rotary device to impart rotation along a preferred axis thereof, i.e., horizontal or vertical, while immersed in the dense phase.

Moreover, rotation of the article along its horizontal axis, especially if the article has a substantially larger dimension along this axis, can be carried out in a substantially shallower coating container than is possible with the to-and-fro method. For the most part, acceptable uniformity of the coating is obtained if about one-half of the article is immersed in the dense phase, and the degree of immersion does not appear to be critical.

Insofar as the speed of rotation is concerned, the speed need not be great during full rotation, and is dependent upon the configuration of the article and its temperature, the desired thickness of the coating, the quality and properties of the coating material, and the time of immersion in the dense phase. Suitably coated articles have been prepared with rotational speeds between about 10 to 100 r.p.m. and immersion periods up to about 8 seconds, but these statistics are not of primary importance as they are dependent upon many variables. A factor that appears to be significant, however, is that at some excessive rotating speeds, cavitation, such as that which occurs when a propeller is rotated at high speeds underwater, may occur and impair the quality of the coating. Moreover, the shape of the article appears to determine to some extent the speed at which cavitation occurs. Thus, the speed of rotation should be regulated to prevent cavitation, but the speed for uniformity of the coating is not limited over a wide range wherein suitable coatings are obtainable.

Partial or full rotation of the article can be accomplished by a substantially simple apparatus, involving a speed-regulated, rotary device and means for coupling the article thereto while suspending the article in the dense phase.

Depending upon the size, shape, weight, etc. of the article being coated, the various modifications in the post treatment, e.g., post-heating, of the coated articles may be used with advantage as described in the Gemmer patent. Furthermore, depending upon the condition of the surface prior to immersion in the fluidized bed, such surface may advantageously be pretreated by roughening, cleaning with solvents, etc.

Various forms of apparatus for carrying out the above-described processes may be used. It generally includes an open top container of suitable cross section, which is horizontally divided into an upper and lower chamber by means of a porous partition. The partition, which should be pervious to the gas but impervious to the particles of coating material, may preferably take the form of a porous ceramic plate, although other similar structures may be advantageously used. A porous plate structure which is preferred is composed of a refractory material bonded together with an aluminous glass at a high firing temperature. Whether composed of this or other materials, the porous plate preferably has an average pore diameter in the range from 0.003 to 0.004 of an inch or less. It is advantageous to have a container in which the walls incline outwardly toward the top, because the smaller particles tend to ascend to greater heights in the fluidized bed. Such a configuration therefore retards the loss of fine particles by entrainment and also permits a more uniform coating to be produced. However, for reasons of economy, a container without the tapering walls may be preferred.

The pulverulent coating material is placed on the upper surface of the partition so that the articles to be coated can be at least partially immersed therein. Thereafter a gas under pressure, as, for example, air or nitrogen is blown into the lower chamber of the container and penetrates through the porous partition into the powder, causing the powder to be converted into a continuously fluidized bed. A blower or fan may be built into the container to supply the gas. The fluidized bed behaves substantially like a fluid so that it comes into contact with all surfaces of the article. When fluidized, the individual particles become separated from one another and the bed of coating material appears to expand to occupy a greater volume and the upper surface of the mass of coating material therefore rises to an equilibrium level within the container.

Typical articles having downwardly facing horizontal surfaces which may be advantageously coated by the method of the invention are a metallic ring having two planar surfaces, an inner cylindrical surface and an outer cylindrical surface. The ring may be coated by mounting the planar surfaces vertically, in which case the upper portion of the inner cylindrical surface will have a downwardly facing portion, and the lower portion of the outer cylindrical surface will also be downwardly facing. Alternatively, the ring may be mounted with either of the planar surfaces, horizontal, in which case one or the other will be downwardly facing. It is evident therefore that in any of the positions described there will be a downwardly facing surface.

A padlock hasp staple having a staple welded to a plate may be coated. The hasp staple, during the coating operation, generally will be held by the staple so that the bottom surface of the plate will be substantially horizontal and downwardly facing. Accordingly, for both the ring and the hasp staple, the article will be advantageously rotated or otherwise be made to assume different attitudes during the period of immersion.

Although the invention is not limited to any particular theory, the improvement in uniformity brought about by the change in attitude of the article in the fluidized bed in the fashion described herein may be due to the flow pattern of the ascending gas stream. That is, the lines of flow of ascending gas may tend to spread out as they approach the downwardly facing bottom surface of the article. This may tend to produce a region below the article where there is a dearth of particles of coating material. By changing the attitude of the article as described herein, the downwardly facing portion which during one period of immersion was exposed to a dearth of particles becomes exposed to an abundance of particles, and therefore acquires a full and uniform coating.

The following examples are presented for the purpose of illustrating how the partial-rotation method of the invention may be carried out with particular reference to articles of certain shapes. However, it will be apparent that there are many modifications and equivalents within the scope of the invention and there is no intention to limit the invention to the procedures described in the examples.

Example 1

An epoxy resin was selected as a coating material. It was composed of 100 parts of a liquid epoxy resin having a specific gravity from 1.15 to 1.17 and a curing temperature specified as 300° F. for 15 minutes. The comparts of a solid epoxy resin having a specific gravity of 1.21, a melting point of 147° to 169° F. and a curing temperature specified as 300° F. for 5 minutes. The composition also included 30 parts of a gray pigment and 30 parts of a catalyst consisting of a modified metaphenylene diamine. Both of the epoxy resins were reaction products of bisphenol A and epichlorohydrin. All of the constituents except the curing agents were hot-blended together and to that mixture at 140° F. the curing agent was added and blended for 5 minutes, after which the material was poured out into a thin sheet and permitted to cool at room temperature. The heating caused a partial cure to form a brittle solid which was capable of being reduced to a powder having a particle size less than 40 mesh. A body of the epoxy resin described above having a particle size less than 40 mesh was placed in a fluidizing vessel. A steel padlock hasp staple having a grease-free surface, a plate 1⅛ by 1½ inches and 3/32 inch in thickness, and preheated to 375° F. was held by the staple with the plate horizontal and facing downwardly and was immersed in the fluidized bed of the epoxy powder for 5 to 6 seconds. During the period of immersion it was held stationary and without any change in attitude. The hasp staple was then immediately removed from the fluidized bed, cooled and examined. Another hasp staple identical with the first was immersed in the fluidized bed for five to six seconds in the same position as the first, except that after approximately one-half of the immersion period had elapsed, the plate was rotated 90° about a horizontal axis without removing it from the fluidized bed and without translational movement, and it was then held stationary in the new position for the remainder of the immersion period. A third hasp staple (preheated to 375° F.) also identical with the first two staples was immersed in the fluidized bed for five to six seconds in the same position as the first two, except that after approximately one-half of the immersion period had elapsed, the plate was rotated 180° about a horizontal axis and it was held in the new position in the fluidized bed for the remainder of the immersion period. All three of the samples were post-heated after they were withdrawn from the fluidized bed for 5 minutes at 375° F. to effect a partial cure of the epoxy resin coating. The thickness of the coating of the first sample was approximately 0.008 inch, the second sample approximately 0.010 inch, and the third sample approximately 0.0155 inch. The first sample had countless pin holes and some bare spots on the bottom surface of the plate. The second sample was much improved over the first on the bottom surface, with just a few pin holes. The third sample had a good coating over the entire article. Even on the initially downwardly facing surface the coating was free of pin holes. The tests show that whereas the downwardly facing surface of an object in the fluidized bed will generally be poorly coated and have many pin holes, by rotating the article, i.e., by changing its attitude (without the need for moving the article to and fro) the character of the coating and quality of the coating can be markedly improved.

Example 2

The procedure described in Example 1 was repeated except that the coating material was polyethylene colored with a black pigment having an average molecular weight of approximately 23,000, a melt index of 6 to 8, and which had been reduced to a particle size of less than 40 mesh, the preheating temperature was 700° F. As in Example 1, the first sample was held in a stationary position without change in attitude in the fluidized bed during the entire coating period; the second sample was rotated through an angle of 90° about a horizontal axis approximately midway through the immersion period, and the third sample was rotated through an angle of 180° approximately midway through the period of immersion. There was no post-heating of the article after immersion. The first sample was badly "pin holed" on the downwardly facing surface of the plate and the coating was very rough. The second sample had a good, complete and uniform coating on all sides, including the initially downwardly facing surface. The third sample also had a good, complete coating on all sides of the article. The thicknesses of the coatings on the three articles were respectively 0.015 inch, 0.013 inch, and 0.023 inch. The results of Example 2 illustrate the advantage of rotating the article, i.e., changing its attitude during the immersion period in producing a uniform coating of polyethylene.

Example 3

Examples 1 and 2 were repeated in all respects except that the coating material was a polyamide consisting of a polymer of epsilon caprolactam having a particle size of less than 40 mesh and a melting point between 425 to 430° F. The preheating temperature was 775° F. and there was no post-heating. The first sample was rough, uncoated spots on the bottom surface, the coating thickness being approximately 0.009 inch. The second sample was fairly good having only a few pin holes around the rivet on the bottom side of the plate, the thickness of the coating being approximately 0.0085 inch. The third sample was better than the second sample having only two or three pin holes around the rivets, the coating otherwise being substantially uniform and having a thickness of 0.011 inch. The tests again illustrate the advantage in producing a uniform coating by rotating the article during the period of immersion.

Example 4

A bed of polyethylene powder of the type employed in Example 2 was fluidized and employed for coating several padlock hasp staples. The hasp staples were preheated to 700° F. and then immersed. The control sample was held in a stationary position with the plate facing downwardly during the entire period of immersion. The other samples were held in the position of the control sample for a portion of the immersion period and then rotated through an angle for the remaining period of the immersion. The samples were withdrawn from the fluidized bed and permitted to cool before inspection. The conditions of the procedures and the results are set forth in the following table.

| Sample | Immersion time | Angle of rotation, degrees | Results |
|---|---|---|---|
| 1 | 4 secs. | Control | Pin holes on most of bottom surface. |
| 2 | 2 secs. face down, 2 secs. at 45°. | 45 | Few pin holes on bottom surface. |
| 3 | 2 secs. face down, 3 secs. at 45°. | 45 | About the same as test 2. |
| 4 | 2 secs. face down, 3 secs. at 30°. | 30 | Slightly more pin holes than test 3 but much better than test 1. |

Example 5

The procedure described in Example 3 was repeated using the same type of coating material and objects to be coated and the same preheating temperature. In the control test (Sample No. 1) the article was held with the plate horizontal and facing downwardly for the entire immersion period, whereas in the other tests the article was rotated midway through the immersion period. The conditions and results are given in the following table.

| Sample | Immersion time | Type attitude, degrees | Results |
|---|---|---|---|
| 1 | 4 secs. | Control | Downwardly facing surface covered only in spots. |
| 2 | 2 secs. face down, 2 secs. at 45°. | 45 | Downwardly facing inclined surface had relatively uniform coating. Lower portion thereof had pin holes but upper portion was relatively free of pin holes. |
| 3 | 2 secs. face down, 2 secs. at 30°. | 30 | |

The following examples are presented for the purpose of illustrating how the full-rotation method of the invention may be carried out with particular reference to articles of certain shapes. Once again, there is no intention to limit the invention to the procedures described in the examples.

Example 6

A bed of the polyamide powder employed in Example 3 was fluidized and employed for coating an annular ring, having an outer diameter of 18 inches and an inner diameter of 8 inches and a thickness of ¼ inch. The depth of the bed was about 10 inches. The ring was preheated to about 575° F. and then immersed in the bed and fully rotated in a vertical plane, with its axis parallel to the bed, for 8 seconds at a speed in the range of 60 to 100 r.p.m. An excellent uniform coating was obtained over the entire surface of the article and post-heating was not required.

When the same ring was coated by means of to-and-fro movement in the fluidized bed, non-uniformity of the thickness was observed, and excess powder accumulated on the upper horizontal surfaces.

Example 7

A bed of heat and ultra-violet light stabilized, plasticized, cellulose acetate butyrate powder, having particle size of less than 40 mesh and a melting point between 360 and 400° F., was fluidized. The pedestal of a modernistic chair was coated. The pedestal was 14 inches high and narrowed to a diameter of about 1½ inches between its base and upper portions. The base diameter was about 17 inches and the upper portion, to which the seat of the chair is affixed, had a diameter of about 6 inches. The pedestal was heated to about 625° F. This high temperature was necessary as the pedestal was made of aluminum, and thus, had low-heat capacity. The pedestal was then immersed in the fluidized bed for 6 seconds and fully rotated at a speed of about 100 r.p.m. in a horizontal position. It was found that a perfectly uniform coating was obtained after the pedestal was removed from the bed. There was no "sugar" coating and post-heating was not required.

Another pedestal of the same dimensions was subjected to substantially the same procedure, but fully rotated in a vertical position at about 75 r.p.m. Similarly, a perfectly uniform coating was obtained.

By contrast when identical pedestals were held in vertical and in horizontal positions and subjected to to-and-fro movement, the downward facing surfaces acquired a thinner coating than other surfaces and the horizontal surfaces were "sugar" coated. Post-heating was required to improve the quality of the coating.

Example 8

A bed of heat stabilized plasticized polyvinyl chloride base resin was fluidized for coating sections of pipe 10 inches long and having 2-inch inner diameter.

The stabilized plasticized polyvinyl resin was formulated in the following manner: 60 parts of medium molecular weight polyvinyl chloride (VR–25 Naugatuck Chemical) was blended with 8.25 parts of epoxidized soya fatty acids (Paraflex G–62, Rohm and Haas), 19.50 parts of Benzoflex 9–88 (Tennessee Chemical Products) dipropylene glycol dibenzoate, and 24 parts of a dispersion of plasticizer and stabilizer. The dispersion of plasticizer and stabilizer was made by mixing 4 parts of a mixture of 1.5 parts Mark WS barium cadmium soap (Argus Chemical Company), 0.75 part Mark C epoxy chelating agent (Argus Chemical Company), and 1.75 parts Paraflex G–62 with 20 parts of a mixture of 70 parts titanium dioxide (R–500 duPont) and 30 parts Paraflex G–62. All the ingredients in the dispersion were mixed together on a three-roll mill. The final mixture contained a total of 59 parts of plasticizer by weight per hundred parts of polyvinyl chloride resin.

The above formulation was blended thoroughly in a ribbon blender by a "sweat-in" technique at 220° F. until the mix was dry. The sweat-in bath powder was then intensively milled by means of a two-roll mill at 300° F. roll temperatures for 15 minutes, at a roll clearance setting of 75 mils. The mixed batch was then pulverized by nitrogen grinding at minus 50° F. and screened to pass through less than a 40-mesh screen. The resulting powder, having a melting point between 320 and 360° F., was used for the fluidized bed.

Separate pipe sections were heated to about 600° F. and fully rotated, with an axis of each parallel to the surface of the bed, at about 60 r.p.m. for about 5 seconds. After removing the pipe sections, a smooth and uniform coating of 10 to 12 mils was obtained over the entire circumference of the pipe. There was no "sugar" coating and post-heating was not required.

By contrast, when the procedure was duplicated and the pipe section was subjected to to-and-fro movement, a non-uniform and "sugar" coating was obtained, and post-heating was required. More specifically, the coating on the top surface was 50 mils, on the sides 15 mils, and on the bottom 12 mils.

Example 9

A bed of the polyvinyl chloride base resin employed in Example 8 was fluidized and employed for coating annular rings. These rings had an outer diameter of about 30 inches, an inner diameter of about 28 inches, and a thickness of about 2 inches. The rings were heated to 525° F. and immersed in the bed and fully rotated in a vertical plane, with their axes parallel to the bed, for 25 to 30 seconds. When the rings were removed from the bed, they were smoothly coated and the variation in thickness over the substantially large surface was between 0.017 and 0.024 inch.

The aforementioned procedure was duplicated, except that an annular ring was immersed in the bed in a vertical position and manually moved to-and-fro therein while suspended by a wire. After 25 to 30 seconds the ring was withdrawn from the bed, and post-heated to 525° F. for 15 minutes. The ring coated in this manner appeared rough and the coating varied from as much as 0.060 to as little as 0.013 on various portions of the ring.

The following claims are intended to define the scope of this invention over the prior art and to cover all changes and modifications falling within the true spirit and scope of the invention.

I claim:

1. The process of forming a uniform layer of material on the surface of an article having an axis which comprises forming a fluidized bed consisting of a dense phase bounded by an upper free surface by passing a distributed ascending current of gas through a mass of solid pulverulent layer-forming material containing particles therein which sinter when heated, immersing the article in said dense phase while said surface is heated to a temperature below the deterioration temperature of the article but at least as high as the sintering temperature of said particles, rotating said article in said dense phase about said axis continuously in the same direction until it is removed from said dense phase and for an interval of time to coat said surface with said layer-forming material, and removing said article from said dense phase.

2. The process of forming a uniform layer of material on the surface of an article having an axis which comprises forming a fluidized bed consisting of a dense phase bounded by an upper free surface by passing a distributed ascending current of gas through a mass of solid pulverulent layer-forming material containing particles therein which sinter when heated, immersing the article in said dense phase while said surface is heated to a temperature below the deterioration temperature of the article but at least as high as the sintering temperature of said particles, rotating said article in said dense phase about said axis continuously in the same direction and at a pre-selected speed at which a uniform coating of said material forms on said surface until it is removed from said dense phase and for an interval of time to coat said surface with said layer-forming material, and removing said articles from said dense phase.

3. A process for forming a uniform coating of resin selected from the group consisting of thermosetting resin and thermoplastic resin on an article by immersion in a fluidized bed, said article having an axis characterized by a horizontal component, said process comprising the steps of (1) immersing the article in a fluidized bed comprising particles of said polymeric resinous material fluidized by an ascending current of a fluidizing gas for a period of time to coat the article with said resinous material, said article being heated to a temperature which is below the deterioration temperature of the article but at least as high as the sintering temperature of said resinous material, (2) continuously rotating said article in one direction about said axis during immersion thereby changing the attitude of said article, and (3) removing the coated article from the fluidized bed.

4. The process of claim 1 in which the article is rotated at a preselected speed at which a uniform coating is formed on said article.

5. The process of claim 1 in which a tubular article is horizontally immersed in said bed and rotated about its horizontal axis.

6. The process according to claim 4 in which said article is rotated at a speed from 10 to 100 revolutions per minute.

7. The process according to claim 4 in which said article is immersed in said dense phase from 5 to 30 seconds.

8. The process according to claim 4 in which said article is rotated at a speed of 60 to 100 revolutions per minute.

9. The process according to claim 8 in which said article is immersed in said dense phase from 5 to 8 seconds.

References Cited

UNITED STATES PATENTS

| 714,104 | 11/1902 | Ellis et al. | 117—113 |
| 862,285 | 8/1907 | Schmidt | 117—23 |
| 2,844,489 | 7/1958 | Gemmer | 117—21 X |
| 3,004,861 | 10/1961 | Davis | 117—18 |
| 3,032,816 | 5/1962 | Zimmerli | 18—51 |

WILLIAM D. MARTIN, *Primary Examiner.*

P. F. ATTAGUILE, *Assistant Examiner.*

U.S. Cl. X.R.

117—21

UNITED STATES PATENT OFFICE
CERTIFICATE OF CORRECTION

Patent No. 3,419,409                                           December 31, 1968

Conrad J. Dettling

It is certified that error appears in the above identified patent and that said Letters Patent are hereby corrected as shown below:

Column 1, after line 17 insert:

This application is a continuation of my copending application Serial No. 331,982, filed November 14, 1963, which, in turn, is a continuation-in-part of application Serial No. 725,688, filed April 1, 1958, and Serial No. 32,500, filed May 17, 1960, all three of which are now abandoned.

same column 1, line 46, "fluidided" should read -- fluidized --. Column 6, line 50, "15 minutes. The com-" should read -- 20 minutes, and 100 --. Column 6, line 53, "5 minutes" should read -- 15 minutes --.

Signed and sealed this 31st day of March 1970.

(SEAL)
Attest:

Edward M. Fletcher, Jr.
Attesting Officer

WILLIAM E. SCHUYLER, JR.
Commissioner of Patents